(12) United States Patent
Jidhage

(10) Patent No.: US 10,044,103 B2
(45) Date of Patent: Aug. 7, 2018

(54) WIRELESS COMMUNICATION NODE WITH AN ANTENNA ARRANGEMENT FOR TRIPLE BAND RECEPTION AND TRANSMISSION

(71) Applicant: Telefonaktiebolaget L M Ericsson (publ), Stockholm (SE)

(72) Inventor: Henrik Jidhage, Mölndal (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 196 days.

(21) Appl. No.: 14/786,373

(22) PCT Filed: Oct. 21, 2015

(86) PCT No.: PCT/EP2015/074390
§ 371 (c)(1),
(2) Date: Oct. 22, 2015

(87) PCT Pub. No.: WO2017/067594
PCT Pub. Date: Apr. 27, 2017

(65) Prior Publication Data
US 2017/0117627 A1   Apr. 27, 2017

(51) Int. Cl.
*H01Q 3/00* (2006.01)
*H01Q 3/26* (2006.01)
(Continued)

(52) U.S. Cl.
CPC ............. *H01Q 3/2617* (2013.01); *H01Q 3/30* (2013.01); *H01Q 5/28* (2015.01); *H01Q 21/245* (2013.01);
(Continued)

(58) Field of Classification Search
CPC .................................. H01Q 3/26; H01Q 3/40
(Continued)

(56) References Cited

FOREIGN PATENT DOCUMENTS

| WO | 03043127 A2 | 5/2003 |
|---|---|---|
| WO | 2014032740 A1 | 3/2014 |
| WO | 2014086386 A1 | 6/2014 |

OTHER PUBLICATIONS

International Search Report and Written Opinion issued in International application No. PCT/EP2015074390 dated Jun. 17, 2016, 10 pages.

*Primary Examiner* — Dao L Phan
(74) *Attorney, Agent, or Firm* — Rothwell, Figg, Ernst & Manbeck, p.c.

(57) ABSTRACT

The present disclosure relates to a wireless communication network node which comprises an antenna arrangement having at least three antenna columns. Each antenna column comprises at least two antenna elements of a first polarization (P1) and at least two antenna elements of a second polarization (P2), orthogonal to the first polarization (P1). For each antenna column, the antenna elements of the first polarization (P1) are connected to a combined port of a corresponding first filter device, and the antenna elements of the second polarization (P2) are connected to a combined port of a corresponding second filter device. Each of the filter devices is arranged to separate signals of different frequency bands between the respective combined port and respective filter ports. The antenna arrangement is arranged for transmission at two different channels (TX1, TX2) and reception at four different channels (RX1, RX2, RX3, RX4) for three different frequency bands ($f_1$, $f_2$, $f_3$).

13 Claims, 2 Drawing Sheets

(51) Int. Cl.
  *H01Q 5/28* (2015.01)
  *H01Q 21/24* (2006.01)
  *H01Q 21/30* (2006.01)
  *H01Q 3/30* (2006.01)
  *H04B 7/10* (2017.01)
  *H01Q 1/24* (2006.01)
  *H01Q 5/50* (2015.01)

(52) U.S. Cl.
  CPC ............... *H01Q 21/30* (2013.01); *H04B 7/10* (2013.01); *H01Q 1/246* (2013.01); *H01Q 5/50* (2015.01)

(58) Field of Classification Search
  USPC .......................... 342/157, 368, 369, 372, 373
  See application file for complete search history.

WIRELESS COMMUNICATION NODE WITH AN ANTENNA ARRANGEMENT FOR TRIPLE BAND RECEPTION AND TRANSMISSION

CROSS-REFERENCE TO RELATED APPLICATIONS

This application is a 35 U.S.C. § 371 National Phase Entry Application from PCT/EP2015/074390, filed Oct. 21, 2015, and designating the United States.

TECHNICAL FIELD

The present disclosure relates to a wireless communication network node, where the node comprises an antenna arrangement. The antenna arrangement in turn comprises at least three antenna columns, each antenna column comprising at least two antenna elements of a first polarization and at least two antenna elements of a second polarization that is orthogonal to the first polarization.

BACKGROUND

In a wireless communication networks, there are communication nodes, for example base stations. Base stations normally comprise sector-covering antenna arrangements. Such an antenna arrangement comprises a number of antenna ports corresponding to branches for uplink and downlink, where downlink denotes transmission, TX, from the base station to other nodes such as mobile terminals, and uplink denotes reception, RX, to the base station from other nodes such as mobile terminals. A downlink branch is thus a TX branch and an uplink branch is thus an RX branch.

Normally a typical system configuration may comprise two TX branches in the form of transmission channels and two RX branches in the form of reception channels, but system configurations with two TX branches and four RX branches are more attractive since the additional two RX branches provide large uplink improvements for a relatively small cost and volume increase. However, two additional antenna ports are required in the antenna arrangement.

An even more complex antenna arrangement is required when two TX branches and four RX branches on a frequency band shall be combined with two TX branches and four RX branches from another frequency band. An example of such an antenna arrangement is disclosed in WO 2014/032740.

Due to a need for increased capacity, there is a desire for having two TX branches and four RX branches for three different frequency bands. WO 2014/086386 discloses an antenna arrangement having four TX branches and four RX branches for three different frequency bands. The disclosure of WO 2014/086386 comprises diplexers at an antenna subarray level i.e. several diplexers per antenna branch, which adds cost and weight.

There is thus a need for a less complicated compact antenna arrangement in a node, where the antenna arrangement has two TX branches and four RX branches for three different frequencies.

SUMMARY

It is an object of the present disclosure to provide a triple-band antenna arrangement in a node, where the antenna arrangement at least has two transmission channels and four reception channels, and where the triple-band antenna arrangement is less complicated than what is previously known.

Said object is obtained by means of a wireless communication network node that comprises an antenna arrangement which in turn comprises at least three antenna columns. Each antenna column comprises at least two antenna elements of a first polarization and at least two antenna elements of a second polarization (P2), where the first polarization and the second polarization are mutually orthogonal. For each antenna column, the antenna elements of the first polarization are connected to a combined port of a corresponding first filter device, and the antenna elements of the second polarization are connected to a combined port of a corresponding second filter device. Each of said filter devices is arranged to separate signals of different frequency bands between the respective combined port and respective filter ports. The antenna arrangement is arranged for transmission at two different channels and reception at four different channels for three different frequency bands.

According to an example, each antenna column comprises a first set of subarrays and a second set of subarrays. Each of said first set of subarrays comprises the antenna having the first polarization and each of said second set of subarrays comprises the antenna elements having the second polarization. Each set of subarrays either comprises:
  at least two subarrays where each subarray in turn comprises at least one antenna element, or
  at least one subarray where each subarray in turn comprises at least two antenna elements.

According to another example, when each set of subarrays comprises at least two subarrays, the antenna of the first polarization are connected to the combined port of said corresponding first filter device via a first corresponding phase altering device.

Furthermore, the antenna elements of the second polarization are connected to the combined port of said corresponding second filter device via a second corresponding phase altering device.

According to another example, each filter device comprises a first filter port and a second filter port. Each filter device is arranged to separate signals of different frequency bands between the respective combined port and the respective filter ports such that each first filter port is arranged for transmission and reception of signals at one frequency band and each second filter port is arranged for reception of signals at another frequency band.

According to another example, for each antenna column, the first filter ports are connected to different transmitter channels.

According to another example, for each antenna column, the first filter ports are connected to either one of a first reception channel and a second reception channel. Also, for each antenna column, the second filter ports are connected to either one of a third reception channel and a fourth reception channel.

According to another example, there is a first transmitter channel and a second transmitter channel. The first transmission channel is associated with the first polarization, and the second transmission channel is associated with the second polarization.

More examples are disclosed in the dependent claims.

A number of advantages are obtained by means of the present disclosure. Mainly a less complicated triple-band antenna arrangement is obtained, where the antenna arrangement in its least complicated form has two transmission channels and four reception channels per frequency band.

BRIEF DESCRIPTION OF THE DRAWINGS

The present disclosure will now be described more in detail with reference to the appended drawings, where.

DETAILED DESCRIPTION

Figure 1:
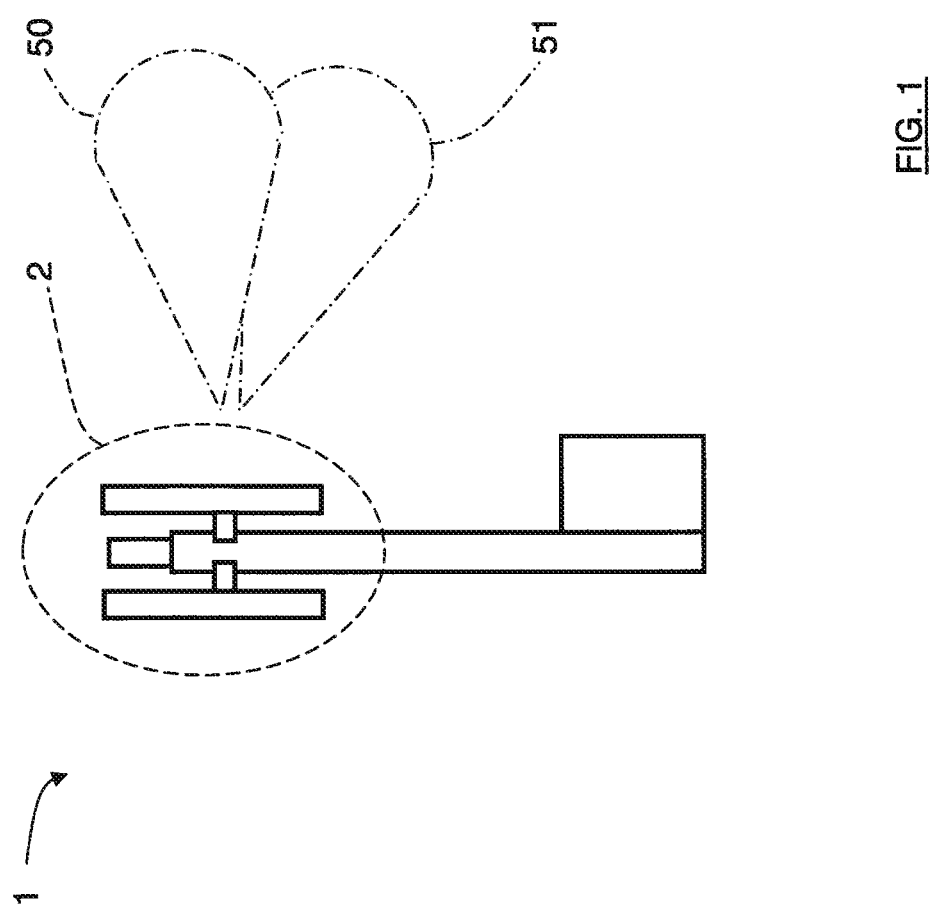
FIG. 1 shows a schematic side view of a node in a wireless communication network.

With reference to FIG. 1, there is a node 1 in a wireless communication network, the node comprising an antenna arrangement 2.

Figure 2:
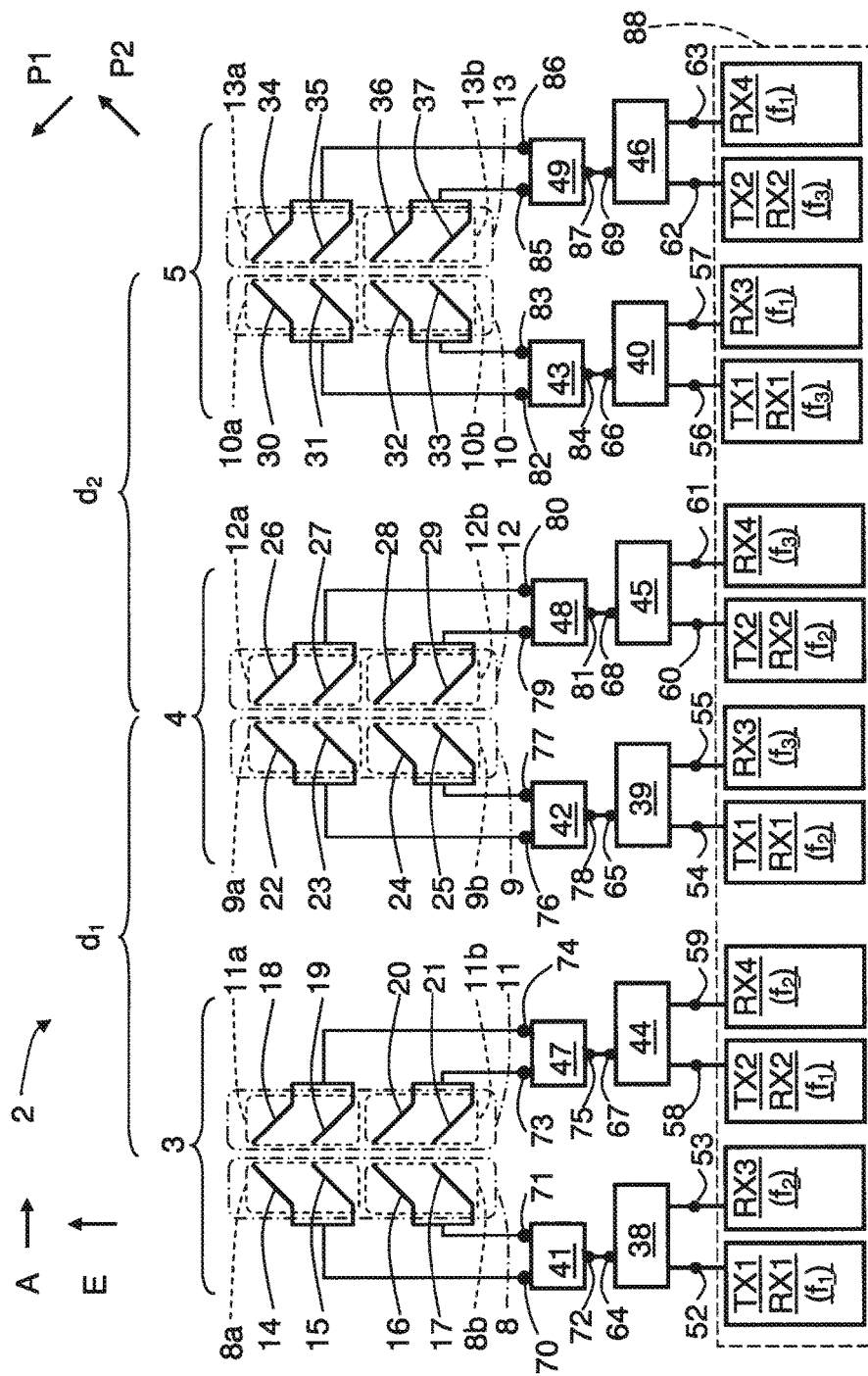
FIG. 2 shows a schematic view of an antenna arrangement according to the present disclosure.

With reference to FIG. 2, the antenna arrangement 2 comprises a first antenna column 3, a second antenna column 4 and a third antenna column 5. The antenna columns 3, 4, 5 are physically separated from each other by a distance d in an azimuth direction A and have respective main extensions in an elevation direction E, where the azimuth direction A and the elevation direction E are mutually orthogonal. The antenna columns 3, 4, 5 are arranged to radiate and/or receive signals by means of antenna radiation lobes 50, 51 in a well-known manner, as schematically indicated with dash-dotted lines in FIG. 1.

Each antenna column 3, 4, 5 comprises a corresponding first set of subarrays 8, 9, 10 and a corresponding second set of subarrays 11, 12, 13, such that the first antenna column 3 comprises a corresponding first set of subarrays 8 and a corresponding second set of subarrays 11, the second antenna column 4 comprises a corresponding first set of subarrays 9 and a corresponding second set of subarrays 12 and the third antenna column 5 comprises a corresponding first set of subarrays 10 and a corresponding second set of subarrays 13. Each set of subarrays 8, 9, 10; 11, 12, 13 is indicated with a dash-dotted line.

The first set of subarrays 8 of the first antenna column 3 comprises two sub-arrays 8a, 8b, and the second set of subarrays 11 of the first antenna column 2 comprises two further sub-arrays 11a, 11b. Each subarray 8a, 8b of the first set of subarrays 8 of the first antenna column 3 comprises two antenna elements 14, 15; 16, 17 having a first polarization P1. Furthermore, each subarray 11a, 11b of the second set of subarrays 11 of the first antenna column 3 comprises two corresponding antenna elements 18, 19; 20, 21 having a second polarization P2, where the first polarization P1 and the second polarization P2 are mutually orthogonal.

In the same way, the first set of subarrays 9 of the second antenna column 4 comprises two sub-arrays 9a, 9b and the second set of subarrays 12 of the second antenna column 4 comprises two further sub-arrays 12a, 12b. Each subarray 9a, 9b of the first set of subarrays 9 of the second antenna column 4 comprises two antenna elements 22, 23; 24, 25 having the first polarization P1. Furthermore, each subarray 12a, 12b of the second set of subarrays 12 of the second antenna column 4 comprises two corresponding antenna elements 26, 27; 28, 29 having the second polarization P2.

Also in the same way, the first set of subarrays 10 of the third antenna column 5 comprises two sub-arrays 10a, 10b and the second set of subarrays 13 of the third antenna column 5 comprises two further sub-arrays 13a, 13b. Each subarray 10a, 10b of the first set of subarrays 10 of the third antenna column 5 comprises two antenna elements 30, 31; 32, 33 having the first polarization P1. Furthermore, each subarray 13a, 13b of the second set of subarrays 13 of the third antenna column 5 comprises two corresponding antenna elements 34, 35; 36, 37 having the second polarization P2.

Each sub-array 8a, 8b; 9a, 9b; 10a, 10b; 11a, 11b; 12a, 12b; 13a, 13b is indicated with a dashed line.

According to the present disclosure, the first set of subarrays 8 of the first antenna column 3 is connected to a first diplexer 38 via a first phase shifter 41, the first phase shifter 41 thus having two antenna side ports 70, 71, connected to the corresponding subarrays 8a, 8b of the first set of subarrays 8 of the first antenna column 3, and one diplexer side port 72 connected to a combined port 64 of the first diplexer 38. The first diplexer 38 in turn further comprises a first filter port 52 and a second filter port 53.

In the same way, the second set of subarrays 11 of the first antenna column 3 is connected to a second diplexer 44 via a second shifter 47, the second phase shifter 47 thus having two antenna side ports 73, 74 connected to the corresponding subarrays 11a, 11b of the second set of subarrays 11 of the first antenna column 3, and one diplexer side port 75 connected to a combined port 67 of the second diplexer 44. The second diplexer 44 in turn further comprises a first filter port 58 and a second filter port 59.

The second antenna column 4 and the third antenna column 5 comprise corresponding arrangements which will be described more briefly.

The second antenna column 4 comprises a third diplexer 39, having a combined port 65, a first filter port 54 and a second filter port 55, the second antenna column 4 further comprising a fourth diplexer 45 having a combined port 68, a first filter port 60 and a second filter port 61. The combined ports 65, 68 are connected to corresponding third and fourth phase shifters 42, 48 via corresponding diplexer side ports 78, 81 at the phase shifters 42, 48. Each of the third and fourth phase shifter 42, 48 is further connected to corresponding subarrays 9a, 9b; 12a, 12b via corresponding two antenna side ports 76, 77; 79, 80.

The third antenna column 5 comprises a fifth diplexer 40, having a combined port 66, a first filter port 56 and a second filter port 57, the third antenna column 5 further comprising a sixth diplexer 46 having a combined port 69, a first filter port 62 and a second filter port 63. The combined ports 66, 69 are connected to corresponding fifth and sixth phase shifters 43, 49 via corresponding diplexer side ports 84, 87 at the phase shifters 43, 49. Each of the fifth and sixth phase shifter 43, 49 is further connected to corresponding subarrays 10a, 10b; 13a, 13b via corresponding two antenna side ports 82, 83; 85, 86.

The combined ports 64, 65, 66, 67, 68, 69 of the diplexers 38, 39, 40, 44, 45, 46 are associated with signals at two spectrally separated frequency bands, being arranged for reception and transmission of signals at the two spectrally separated frequency bands per diplexer.

The diplexers 38, 39, 40, 44, 45, 46 are in a known way arranged to separate signals at one frequency band and signals at another frequency band between the respective combined port 64, 65, 66, 67, 68, 69 and the respective filter ports 52, 53, 54, 55; 56, 57, 58, 59, 60, 61, 62, 63 such that each first filter port 52, 58; 54, 60; 56, 62 is arranged for transmission and reception of signals at one frequency band $f_1$, $f_2$, $f_3$, and each corresponding second filter port 53, 59; 55, 61; 57, 63 is arranged for reception of signals at another frequency band $f_1$, $f_2$, $f_3$.

Here, for the first antenna column 3, the first diplexer 38 is arranged to separate signals at a first frequency band $f_1$ and signals at a second frequency band $f_2$ between the respective combined port 64 the respective filter ports 52, 53, and the second diplexer 44 is arranged to separate signals at the first frequency band $f_1$ and signals at the second frequency band $f_2$ between the respective combined port 67 the respective filter ports 58, 59.

For the second antenna column 4, the third diplexer 39 is arranged to separate signals at the second frequency band $f_2$ and signals at a third frequency band $f_3$ between the respective combined port 65 the respective filter ports 54, 55, and the fourth diplexer 45 is arranged to separate signals at the second frequency band $f_2$ and signals at the third frequency band $f_3$ between the respective combined port 68 and the respective filter ports 60, 61.

For the third antenna column 5, the fifth diplexer 40 is arranged to separate signals at the third frequency band $f_3$ and signals at the first frequency band $f_1$ between the respective combined port 66 the respective filter ports 56, 57, and the sixth diplexer 46 is arranged to separate signals at the third frequency band $f_3$ and signals at the first frequency band $f_1$ between the respective combined port 69 and the respective filter ports 62, 63.

The first filter ports 52, 58; 54, 60; 56, 62 are further arranged for both transmission and reception, and the second filter ports 53, 59; 55, 61; 57, 63 are arranged for reception.

For the first antenna column 3, the first filter port 52 of the first diplexer 38 is connected to a first transmission channel TX1 and to a first reception channel RX1 at the first frequency band $f_1$. The second filter port 53 of the first diplexer 38 is connected to a third reception channel RX3 at the second frequency band $f_2$. The first filter port 58 of the second diplexer 44 is connected to a second transmission channel TX2 and to a second reception channel RX2 at the first frequency band $f_1$. The second filter port 59 of the second diplexer 44 is connected to a fourth reception channel RX4 at the second frequency band $f_2$.

For the second antenna column 4, the first filter port 54 of the third diplexer 39 is connected to the first transmission channel TX1 and to the first reception channel RX1 at the second frequency band $f_2$. The second filter port 55 of the third diplexer 39 is connected to a third reception channel RX3 at the third frequency band $f_3$. The first filter port 60 of the fourth diplexer 45 is connected to the second transmission channel TX2 and to the second reception channel RX2 at the second frequency band $f_2$. The second filter port 61 of the fourth diplexer 45 is connected to a fourth reception channel RX4 at the third frequency band $f_3$.

For the third antenna column 5, the first filter port 56 of the fifth diplexer 40 is connected to the first transmission channel TX1 and to the first reception channel RX1 at the third frequency band $f_3$. The second filter port 57 of the fifth diplexer 40 is connected to a third reception channel RX3 at the first frequency band $f_1$. The first filter port 62 of the sixth diplexer 46 is connected to the second transmission channel TX2 and to the second reception channel RX2 at the third frequency band $f_3$. The second filter port 63 of the sixth diplexer 45 is connected to a fourth reception channel RX4 at the first frequency band $f_1$.

This means that as a total there are two transmission channels TX1, TX2 and four reception channels RX1, RX2, RX3, RX4 per frequency band $f_1$, $f_2$, $f_3$. By means of the diplexers 38, 39, 40, 44, 45, 46, reception of three different frequency bands $f_1$, $f_2$, $f_3$ is possible for each set of subarrays 8, 9, 10, 11, 12, 13. For each antenna column 3, 4, 5, the two sets of subarrays 8, 11; 9, 12; 10, 13 receive on different reception channels which enables polarization diversity. This is however not necessary for the present disclosure, but constitutes an advantageous configuration. It is, however, necessary that, for each diplexer 38, 39, 40, 44, 45, 46, one filter port 52, 58; 54, 60; 56, 62 is connected to both a reception channel and a transmission channel of one frequency band, and that the other filter port 53, 59; 55, 61; 57, 63 is connected to a reception channel of another frequency band.

By placing the two transmission channels TX1, TX2 for the first frequency band $f_1$ on the first antenna column 3, the two transmission channels TX1, TX2 for the second frequency band $f_2$ on the second antenna column 4, and the two transmission channels TX1, TX2 for the third frequency band $f_3$ on the third antenna column 5, individual tilt is achieved on downlink, which is important for limiting downlink interference between cells.

The additional third reception channel RX3 and fourth reception channel RX4 at one of the first frequency band the second frequency band $f_2$ and at the third frequency band $f_3$ will get the same tilt as the transmission channels TX1, TX2 for another one of the frequency bands $f_1$, $f_2$, $f_3$. The present disclosure comprises an insight that this has a limited system impact regarding the total reception performance assuming that the tilt settings between the first frequency band $f_1$, the second frequency band $f_2$ and at the third frequency band $f_3$ are not completely different.

The present disclosure discloses an antenna arrangement 2 having three antenna columns 3, 4, 5 with dual polarized antenna elements 14, 15; 16, 17; 22, 23; 24, 25; 30, 31; 32, 33; 18, 19; 20, 21; 26, 27; 28, 29; 34, 35; 36, 37. The antenna arrangement 2 has six wideband ports, in the example presented in the form of the diplexer side ports 72, 75; 78, 81; 84, 87 of the phase shifters 41, 47; 42, 48; 43, 49, which ports support three bands $f_1$, $f_2$, $f_3$. A corresponding diplexer 38, 44; 39, 45; 40, 46 is connected to each antenna port 72, 75; 78, 81; 84, 87 creating two frequency separated ports for each antenna column 3, 4, 5. These two ports will have common tilt since they share a common phase shifter.

The present disclosure is not limited to the above, but may vary within the scope of the appended claims. For example, it is conceivable that there are no phase shifters, and that in a case with more than one subarray, power combiners/dividers may be used.

The polarizations may have any directions, but should always be orthogonal.

When terms like orthogonal and parallel are used, these terms are not to be interpreted as mathematically exact, but within what is practically obtainable.

In each antenna column 3, 4, 5 there are antenna elements 14, 15; 16, 17; 22, 23; 24, 25; 30, 31; 32, 33 of a first polarization P1 and antenna elements 18, 19; 20, 21; 26, 27; 28, 29; 34, 35; 36, 37 of second polarization P2. For each antenna column 3, 4, 5 antenna elements of different polarizations are shown as separate antenna elements, but are practically often combined into dual polarized antenna elements that share the same physical location, for example in the form of a cross.

The polarizations P1, P2 are shown to be perpendicular to the schematically indicated antenna elements 14, 15; 16, 17; 22, 23; 24, 25; 30, 31; 32, 33; 18, 19; 20, 21; 26, 27; 28, 29; 34, 35; 36, 37, which is the case for antenna elements in the form of slots, but this is only by way of example. For dipole antenna elements, the polarizations P1, P2 are parallel to the antenna elements, and for patch antenna elements, the polarization runs in a direction along the patch in dependence of its feeding.

The phase shifters 41, 47; 42, 48; 43, 49 may be constituted by any suitable phase altering devices, and the diplexers 38, 44; 39, 45; 40, 46 may be constituted by any suitable filter devices.

The transmission channels TX1, TX2 the reception channels RX1, RX2, RX3, RX4 are suitably positioned in a transceiver arrangement 88 which may comprise one or more separate transceiver sub-arrangements.

The node may for example be constituted by any kind of base station, macro station, pico station and repeater station, as well as any kind of suitable user terminal.

Generally, the present disclosure relates to a wireless communication network node 1, the node 1 comprising an antenna arrangement 2, the antenna arrangement 2 in turn comprising at least three antenna columns 3, 4, 5 each antenna column 3, 4, 5 comprising at least two antenna elements 14, 15; 16, 17; 22, 23; 24, 25; 30, 31; 32, 33 of a first polarization P1 and at least two antenna elements 18, 19; 20, 21; 26, 27; 28, 29; 34, 35; 36, 37 of a second polarization P2, the first polarization P1 and the second polarization P2 being mutually orthogonal. For each antenna column 3, 4, 5, the antenna elements 14, 15; 16, 17; 22, 23; 24, 25; 30, 31; 32, 33 of the first polarization P1 are connected to a combined port 64, 65, 66 of a corresponding first filter device 38, 39, 40, and the antenna elements 18, 19; 20, 21; 26, 27; 28, 29; 34, 35; 36, 37 of the second polarization P2 are connected to a combined port 67, 68, 69 of a corresponding second filter device 44, 45, 46, each of said filter devices 38, 39, 40; 44, 45, 46 being arranged to separate signals of different frequency bands between the respective combined port 64, 65, 66; 67, 68, 69 and respective filter ports 52, 53; 54, 55; 56, 57; 58, 59; 60, 61; 62, 63 where the antenna arrangement 2 is arranged for transmission at two different channels TX1, TX2 and reception at four different channels RX1, RX2, RX3, RX4 for three different frequency bands $f_1, f_2, f_3$.

According to an example, each antenna column 3, 4, 5 comprises a first set of subarrays 8, 9, 10 and a second set of subarrays 11, 12, 13, where each of said first set of subarrays 8, 9, 10 comprises the antenna elements 14, 15; 16, 17; 22, 23; 24, 25; 30, 31; 32, 33 having the first polarization P1 and each of said second set of subarrays 11, 12, 13 comprises the antenna elements 18, 19; 20, 21; 26, 27; 28, 29; 34, 35; 36, 37 having the second polarization P2, each set of subarrays 8, 9, 10; 11, 12, 13 either comprising:

at least two subarrays 8a, 8b; 9a, 9b; 10a, 10b; 11a, 11b; 12a, 12b; 13a, 13b where each subarray 8a, 8b; 9a, 9b; 10a, 10b; 11a, 11b; 12a, 12b; 13a, 13b in turn comprises at least one antenna element 14, 15; 16, 17; 18, 19; 20, 21; 22, 23; 24, 25; 26, 27; 28, 29; 30, 31; 32, 33; 34, 35; 36, 37, or at least one subarray where each subarray 8a, 8b; 9a, 9b; 10a, 10b; 11a, 11b; 12a, 12b; 13a, 13b in turn comprises at least two antenna elements 14, 15; 16, 17; 18, 19; 20, 21; 22, 23; 24, 25; 26, 27; 28, 29; 30, 31; 32, 33; 34, 35; 36, 37.

According to an example, when each set of subarrays 8, 9, 10; 11, 12, 13 comprises at least two subarrays 8a, 8b; 9a, 9b; 10a, 10b; 11a, 11b; 12a, 12b; 13a, 13b, the antenna elements 14, 15; 16, 17; 22, 23; 24, 25; 30, 31; 32, 33 of the first polarization P1 are connected to the combined port 64, 65, 66 of said corresponding first filter device 38, 39, 40 via a first corresponding phase altering device 41, 42, 43, and the antenna elements 18, 19; 20, 21; 26, 27; 28, 29; 34, 35; 36, 37 of the second polarization P2 are connected to the combined port 67, 68, 69 of said corresponding second filter device 44, 45, 46 via a second corresponding phase altering device 47, 48, 49.

According to an example, the phase altering devices 41, 42, 43; 47, 48, 49 are arranged to control the phase of the subarrays 8a, 8b; 9a, 9b; 10a, 10b; 11a, 11b; 12a, 12b; 13a, 13b such that an electrical steering of an antenna radiation main lobe 50, 51 of each antenna column 3, 4, 5 is enabled.

According to an example, each filter device 38, 39, 40; 44, 45, 46 comprises a first filter port 52, 54, 56, 58, 60, 62 and a second filter port 53, 55, 57, 59, 61, 63, each filter device 38, 39, 40; 44, 45, 46 being arranged to separate signals of different frequency bands between the respective combined port 64, 65, 66; 67, 68, 69 and the respective filter ports 52, 53; 54, 55; 56, 57; 58, 59; 60, 61; 62, 63 such that each first filter port 52, 54, 56, 58, 60, 62 is arranged for transmission and reception of signals at one frequency band and each second filter port 53, 55, 57, 59, 61, 63 is arranged for reception of signals at another frequency band.

According to an example, that for each antenna column 3, 4, 5, the first filter ports 52, 54, 56, 58, 60, 62 are connected to different transmitter channels TX1, TX2.

According to an example, for each antenna column 3, 4, 5, the first filter ports 52, 58; 54, 60; 56, 62 are connected to either one of a first reception channel RX1 and a second reception channel RX2, and for each antenna column 3, 4, 5 the second filter ports 53, 59; 55, 61; 57, 63 are connected to either one of a third reception channel RX3 and a fourth reception channel RX4.

According to an example, there is a first transmitter channel TX1 and a second transmitter channel TX2, the first transmission channel TX1 being associated with the first polarization P1 and the second transmission channel TX2 being associated with the second polarization P2.

According to an example, each filter device 38, 39, 40; 44, 45, 46 is constituted by a diplexer.

According to an example, the antenna columns 3, 4, 5 have respective main extensions in an elevation direction E.

According to an example, the antenna columns 3, 4, 5 are physically separated in either an azimuth direction A or the elevation direction E, the azimuth direction A and the elevation direction E being mutually orthogonal.

The invention claimed is:

1. A wireless communication network node, the node comprising:
   an antenna arrangement, comprising:
   at least three antenna columns each antenna column comprising at least four antenna elements of a first polarization (P1) and at least four antenna elements of a second polarization (P2), the first polarization (P1) and the second polarization (P2) being mutually orthogonal, wherein
   for each antenna column, the antenna elements of the first polarization (P1) are connected to a combined port of a corresponding first filter device,
   for each antenna column, the antenna elements of the second polarization (P2) are connected to a combined port of a corresponding second filter device,
   each of said filter devices being arranged to separate signals of different frequency bands between the respective combined port and respective filter ports, and
   the antenna arrangement is arranged for transmission at two different channels (TX1, TX2) and reception at four different channels (RX1, RX2, RX3, RX4) for three different frequency bands ($f_1$, $f_2$, $f_3$).

2. The node of claim 1, wherein each antenna column comprises a first set of subarrays and a second set of subarrays, where each of said first set of subarrays comprises the antenna elements having the first polarization (P1) and each of said second set of subarrays comprises the antenna elements having the second polarization (P2), each set of subarrays either comprising:

at least two subarrays where each subarray in turn comprises at least one antenna element, or at least one subarray where each subarray in turn comprises at least two antenna elements.

3. The node of claim 2, wherein, when each set of subarrays comprises at least two subarrays, the antenna elements of the first polarization (P1) are connected to the combined port of said corresponding first filter device via a first corresponding phase altering device, and the antenna elements of the second polarization (P2) are connected to the combined port of said corresponding second filter device via a second corresponding phase altering device.

4. The node of claim 3, wherein the phase altering devices are arranged to control the phase of the subarrays such that an electrical steering of an antenna radiation main lobe of each antenna column is enabled.

5. The node of claim 1, wherein each filter device comprises a first filter port and a second filter port, each filter device being arranged to separate signals of different frequency bands between the respective combined port and the respective filter ports such that each first filter port is arranged for transmission and reception of signals at one frequency band and each second filter port is arranged for reception of signals at another frequency band.

6. The node of claim 5, wherein, for each antenna column, the first filter ports are connected to different transmitter channels (TX1, TX2).

7. The node of claim 5, wherein, for each antenna column, the first filter ports are connected to either one of a first reception channel (RX1) and a second reception channel (RX2), and for each antenna column the second filter ports are connected to either one of a third reception channel (RX3) and a fourth reception channel (RX4).

8. The node of claim 1, wherein there is a first transmitter channel (TX1) and a second transmitter channel (TX2), the first transmission channel (TX1) being associated with the first polarization (P1) and the second transmission channel (TX2) being associated with the second polarization (P2).

9. The node of claim 1, wherein each filter device is constituted by a diplexer.

10. The node of claim 1, wherein the antenna columns have respective main extensions in an elevation direction (E).

11. The node of claim 10, wherein the antenna columns are physically separated in either an azimuth direction (A) or the elevation direction (E), the azimuth direction (A) and the elevation direction (E) being mutually orthogonal.

12. A wireless communication network node, the node comprising:
an antenna arrangement comprising a first column, a second column, and a third column;
the first column comprising:
first and second antenna elements of a first polarization (P1) and third and fourth antenna elements of a second polarization (P2), the first polarization (P1) and the second polarization (P2) being mutually orthogonal;
a first phase shifter coupled to the first and second antenna elements of the first polarization (P1) and having a first diplexer-side port;
a second phase shifter coupled to the third and fourth antenna elements of the second polarization (P2) and having a second diplexer-side port;
a first diplexer having a first combined port and first and second filter ports, wherein the first antenna element and the second antenna element of the first polarization (P1) are connected to the first diplexer-side port of the first phase shifter and the first phase shifter is connected to the first combined port of the first diplexer; and
a second diplexer having a second combined port and third and fourth filter ports, wherein the third antenna element and the fourth antenna element of the second polarization (P2) are connected to the second diplexer-side port of the second phase shifter and the second phase shifter is connected to the second combined port of the second diplexer;
the first diplexer being arranged to separate signals of different frequency bands between the first combined port and the first and second filter ports; and
the second diplexer being arranged to separate signals of different frequency bands between the second combined port and the third and fourth filter ports;
the second column comprising:
fifth and sixth antenna elements of the first polarization (P1) and seventh and eighth antenna elements of the second polarization (P2);
the fifth and sixth antenna elements of the first polarization (P1) are connected to a third combined port of a third diplexer;
a third phase shifter coupled to the fifth and sixth antenna elements of the first polarization (P1) and having a third diplexer-side port;
a fourth phase shifter coupled to the seventh and eighth antenna elements of the second polarization (P2) and having a fourth diplexer-side port;
a third diplexer having a third combined port and fifth and sixth filter ports, wherein the fifth antenna element and the sixth antenna element of the first polarization (P1) are connected to the third diplexer-side port of the third phase shifter and the third phase shifter is connected to the third combined port of the third diplexer;
a fourth diplexer having a fourth combined port and seventh and eighth filter ports, wherein the seventh antenna element and the eighth antenna element of the second polarization (P2) are connected to the fourth diplexer-side port of the fourth phase shifter and the fourth phase shifter is connected to the fourth combined port of the fourth diplexer;
the third diplexer being arranged to separate signals of different frequency bands between the third combined port and the fifth and sixth filter ports; and
the fourth diplexer being arranged to separate signals of different frequency bands between the fourth combined port and the seventh and eighth filter ports; and
the third column comprising:
ninth and tenth antenna elements of the first polarization (P1) and eleventh and twelfth antenna elements of the second polarization (P2);
the ninth and tenth antenna elements of the first polarization (P1) are connected to a fifth combined port of a fifth diplexer;
a fifth phase shifter coupled to the ninth and tenth antenna elements of the first polarization (P1) and having a fifth diplexer-side port;
a sixth phase shifter coupled to the eleventh and twelfth antenna elements of the second polarization (P2) and having a sixth diplexer-side port;
a fifth diplexer having a fifth combined port and ninth and tenth filter ports, wherein the ninth antenna element and the tenth antenna element of the first polarization (P1) are connected to the fifth diplexer-side port of the fifth phase shifter and the fifth phase shifter is connected to the fifth combined port of the fifth diplexer;

a sixth diplexer having a sixth combined port and eleventh and twelfth filter ports, wherein the eleventh antenna element and the twelfth antenna element of the second polarization (P2) are connected to the sixth diplexer-side port of the sixth phase shifter and the sixth phase shifter is connected to the sixth combined port of the sixth diplexer;

the fifth diplexer being arranged to separate signals of different frequency bands between the fifth combined port and the ninth and tenth filter ports; and the sixth diplexer being arranged to separate signals of different frequency bands between the sixth combined port and the eleventh and twelfth filter ports, wherein the antenna arrangement is arranged for transmission at two different channels (TX1, TX2) and reception at four different channels (RX1, RX2, RX3, RX4) for three different frequency bands ($f_1$, $f_2$, $f_3$).

13. The node of claim 12, wherein the first column further comprises:
- thirteenth and fourteenth antenna elements of the first polarization (P1) and fifteenth and sixteenth antenna elements of the second polarization (p2);
- the first phase shifter being coupled to the thirteenth and fourteenth antenna elements of the first polarization (P1);
- the second phase shifter being coupled to the fifteenth and sixteenth antenna elements of the second polarization (P2);
- wherein the thirteenth antenna element and the fourteenth antenna element of the first polarization (P1) are connected to the first diplexer-side port of the first phase shifter; and
- wherein the fifteenth antenna element and the sixteenth antenna element of the second polarization (P2) are connected to the second diplexer-side port of the second phase shifter;

the second column comprising:
- seventeenth and eighteenth antenna elements of the first polarization (P1) and nineteenth and twentieth antenna elements of the second polarization (p2);
- the third phase shifter being coupled to the seventeenth and eighteenth antenna elements of the first polarization (P1);
- the fourth phase shifter being coupled to the nineteenth and twentieth antenna elements of the second polarization (P2);
- wherein the seventeenth antenna element and the eighteenth antenna element of the first polarization (P1) are connected to the third diplexer-side port of the third phase shifter; and
- wherein the nineteenth antenna element and the twentieth antenna element of the second polarization (P2) are connected to the fourth diplexer-side port of the fourth phase shifter; and the third column comprising:
- twenty-first and twenty-second antenna elements of the first polarization (P1) and twenty-third and twenty-fourth antenna elements of the second polarization (p2);
- the fifth phase shifter being coupled to the twenty-first and twenty-second antenna elements of the first polarization (P1);
- the sixth phase shifter being coupled to the twenty-third and twenty-fourth antenna elements of the second polarization (P2);
- wherein the twenty-first antenna element and the twenty-second antenna element of the first polarization (P1) are connected to the fifth diplexer-side port of the fifth phase shifter; and
- wherein the twenty-third antenna element and the twenty-fourth antenna element of the second polarization (P2) are connected to the sixth diplexer-side port of the sixth phase shifter.

* * * * *